(12) United States Patent
Sarukkai et al.

(10) Patent No.: US 12,021,937 B2
(45) Date of Patent: *Jun. 25, 2024

(54) CLOUD SERVICE ACCOUNT MANAGEMENT METHOD

(71) Applicant: Skyhigh Security LLC, Plano, TX (US)

(72) Inventors: Sekhar Sarukkai, Cupertino, CA (US); Kaushik Narayan, San Jose, CA (US); Rajiv Gupta, Los Altos, CA (US)

(73) Assignee: Skyhigh Security, LLC, Plano, TX (US)

( * ) Notice: Subject to any disclaimer, the term of this patent is extended or adjusted under 35 U.S.C. 154(b) by 555 days.

This patent is subject to a terminal disclaimer.

(21) Appl. No.: 17/161,445

(22) Filed: Jan. 28, 2021

(65) Prior Publication Data

US 2021/0152655 A1 May 20, 2021

Related U.S. Application Data

(63) Continuation of application No. 15/622,654, filed on Jun. 14, 2017, now Pat. No. 10,911,564, which is a
(Continued)

(51) Int. Cl.
*H04L 9/40* (2022.01)
*H04L 29/06* (2006.01)
*H04L 29/08* (2006.01)
*H04L 67/10* (2022.01)
*H04L 67/306* (2022.01)

(52) U.S. Cl.
CPC ............ *H04L 67/306* (2013.01); *H04L 63/08* (2013.01); *H04L 63/102* (2013.01); *H04L 63/20* (2013.01); *H04L 67/10* (2013.01)

(58) Field of Classification Search
CPC ..... H04L 67/306; H04L 63/08; H04L 63/102; H04L 63/20; H04L 67/10
See application file for complete search history.

(56) References Cited

U.S. PATENT DOCUMENTS 8,225,383 B1 7/2012 Channakeshava et al.
8,359,016 B2 1/2013 Lindeman
(Continued)

OTHER PUBLICATIONS

Notice of Allowance dated Jul. 1, 2020 in U.S. Appl. No. 15/419,874, pp. 2-5.
(Continued)

*Primary Examiner* — Darshan I Dhruv
(74) *Attorney, Agent, or Firm* — Byrne Poh LLP (57) ABSTRACT

A cloud service account management method identifies unauthorized or unmanaged accounts making administration console access or API access at a cloud computing service and triggers a work flow to place the accounts under management. In one embodiment, the user device is directed to a registration portal to provide access credentials of the unauthorized account. The loud service account management method uses the access credentials to retrieve a list of account users associated with the account. Once the accounts are made managed, the cloud service account management method can monitor the activities of the account, including all of the account users, and can apply compliance or security policies to the managed accounts.

20 Claims, 9 Drawing Sheets

Related U.S. Application Data continuation-in-part of application No. 15/419,874, filed on Jan. 30, 2017, now Pat. No. 10,771,469.

(56) References Cited

U.S. PATENT DOCUMENTS

| | | | |
|---|---|---|---|
| 8,813,242 B1 | 8/2014 | Ginevan | |
| 8,863,253 B2 | 10/2014 | Iverson et al. | |
| 9,060,239 B1 | 6/2015 | Sinha | |
| 9,602,540 B1* | 3/2017 | Johansson | H04L 63/20 |
| 9,749,331 B1* | 8/2017 | Koeten | H04L 63/0815 |
| 2006/0123472 A1* | 6/2006 | Schmidt | H04L 63/0815 726/8 |
| 2006/0248600 A1* | 11/2006 | O'Neill | H04L 63/08 707/E17.107 |
| 2007/0204346 A1 | 8/2007 | Meier | |
| 2010/0299152 A1 | 11/2010 | Batchu | |
| 2012/0072985 A1* | 3/2012 | Davne | H04L 67/10 709/225 |
| 2013/0298238 A1 | 11/2013 | Shah et al. | |
| 2014/0096186 A1* | 4/2014 | Barton | G06F 21/6218 726/1 |
| 2015/0007274 A1* | 1/2015 | Chang | G06F 21/78 726/4 |
| 2015/0350221 A1* | 12/2015 | Espinosa | G06F 21/6245 726/4 |
| 2016/0275303 A1* | 9/2016 | Narayanaswamy | H04L 9/0869 |
| 2016/0344736 A1* | 11/2016 | Khait | H04L 63/102 |
| 2017/0045932 A1 | 2/2017 | Bostick et al. | |
| 2017/0048260 A1* | 2/2017 | Peddemors | H04L 63/1416 |
| 2017/0188232 A1 | 6/2017 | Raleigh et al. | |
| 2018/0034823 A1 | 2/2018 | Parees et al. | |

OTHER PUBLICATIONS

Notice of Allowance dated Oct. 15, 2020 in U.S. Appl. No. 15/622,654, pp. 2-5.

Office Action dated Mar. 14, 2019 in U.S. Appl. No. 15/419,874, pp. 2-19.

Office Action dated Mar. 14, 2019 in U.S. Appl. No. 15/622,654, pp. 2-23.

Office Action dated May 1, 2020 in U.S. Appl. No. 15/622,654, pp. 2-8.

Office Action dated Sep. 5, 2019 in U.S. Appl. No. 15/419,874, pp. 2-21.

Office Action dated Sep. 5, 2019 in U.S. Appl. No. 15/622,654, pp. 2-25.

* cited by examiner

CLOUD SERVICE ACCOUNT MANAGEMENT METHOD

CROSS REFERENCE TO RELATED APPLICATIONS

This application is a continuation of U.S. patent application Ser. No. 15/622,654, filed Jun. 14, 2017, which is a continuation-in-part of U.S. patent application Ser. No. 15/419,874, filed Jan. 30, 2017 and entitled "CLOUD SERVICE ACCOUNT MANAGEMENT", each of which is hereby incorporated by reference herein in its entirety.

BACKGROUND

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

In particular, a system administrator or an information services officer of an enterprise may be charged with the responsibility of administrating one or more cloud service providers, such as an IaaS provider, on behalf of the enterprise for the users of the enterprise. The administrator accesses the cloud service provider through an administration console. The administrator generally uses an authorized account to access the console. However, in some cases, the administrator may have created a shadow account to access a cloud service provider. These shadow accounts are not managed or monitored by the enterprise and may pose security risks for the enterprise.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process or a hardware processor; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a cloud service account management method identifies unauthorized or unmanaged accounts making administration console or API access at a cloud computing service and triggers a work flow to place the unauthorized/unmanaged accounts under management. Once the accounts are made managed, the cloud service account management method can verify the configurations of the instances created by the account and can monitor the activities of the accounts. The cloud service account management method can apply compliance or security policies to the managed accounts at the cloud computing services.

In the present description, a "cloud-based service" or "cloud service" or "cloud computing services" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, cloud computing services, as used herein, can include IaaS (Infrastructure as a Service) or SaaS (Software as a Service) or other types of cloud computing services.

With the proliferation of cloud-based services, an enterprise may wish to adopt one or more cloud computing services for data storage or other applications. The users or employees of the enterprise may access the cloud computing services within or outside of the enterprise's own data network. In some cases, the enterprise may force network traffic between a client device and a cloud-based service to be re-directed through a secure web gateway. In some cases, the users of the enterprise access the cloud-based services without going through the enterprise data network. Regardless of the access methods, the enterprise may wish to deploy security measures to monitor and control the use of the cloud-based services by the enterprise's employees and users. In embodiments of the present invention, the enterprise employs a cloud service security system which implements cloud service account management method to discover for unauthorized or unmanaged accounts attempting access at a cloud service provider and to initiate a work flow to bring the unauthorized/unmanaged accounts into management and monitoring by the enterprise.

Figure 1:
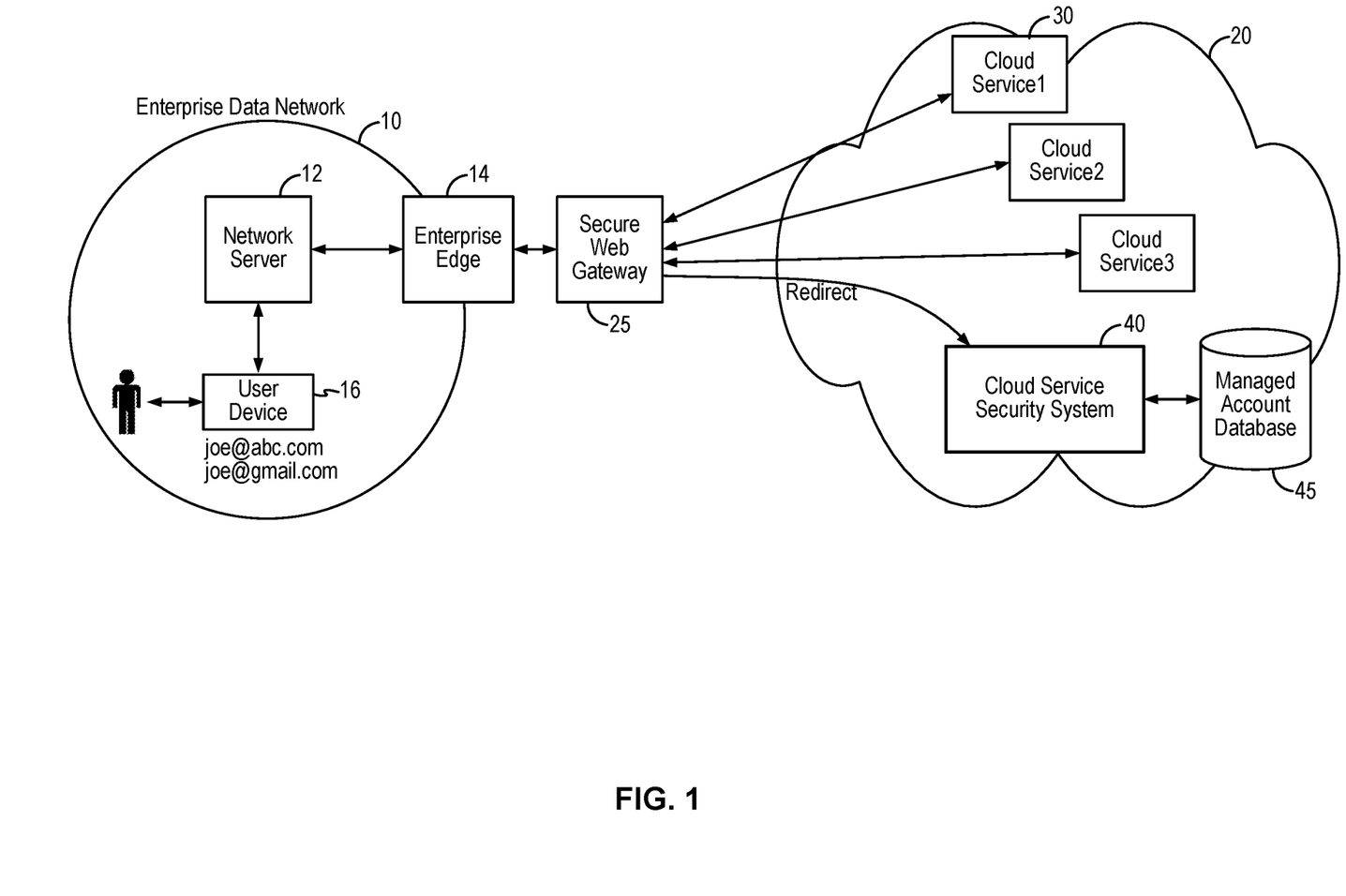
FIG. 1 illustrates an environment in which a cloud service security system and method of the present invention can be implemented in some embodiments.

FIG. 1 illustrates an environment in which a cloud service security system and method of the present invention can be implemented in some embodiments. Referring to FIG. 1, an enterprise may operate an enterprise data network 10 including one or more network servers 12. The enterprise data network 10 includes an enterprise network edge 14, such as a proxy server, which is used to communicate with outside data networks, such as the public data network 20, which can be the publicly accessible Internet in one example. The enterprise data network communicates with the outside data network over a communication network. To ensure network security, the enterprise may deploy a secure web gateway 25 to monitor ingress and egress web traffic of the enterprise data network 10 to enforce security policy compliance. In some embodiments, the secure web gateway 25 can be implemented as a firewall, such as a Next-Generation Firewall.

The enterprise or users of the enterprise data network 10 may wish to use one or more cloud computing services provided by cloud service providers 30, such as Cloud Service 1, Cloud Service 2, and Cloud Service 3, that are deployed on the public data network 20. Network traffic from the user device 16 goes through the network server 12 and travels to the enterprise network edge 14 and through the secure web gateway 25 onto the cloud service providers. Network traffic from the cloud service providers are received at the secure web gateway 25 and then pass to the enterprise network edge 14 and then transmitted onto the network server 12 to be distributed to the user device 16.

As thus configured, a system administrator or an information services officer of the enterprise may be tasked with the responsibility of managing the deployment of the cloud computing services on behalf of the enterprise. For example, the system administrator may be tasked with the responsibility of creating new instances of applications provided by the cloud service providers. For example, the administrator may start up an instance of a database or an instance of other applications for the users of the enterprise to use. The system administrator typically uses an administration console at the cloud computing service to access the cloud computing service to perform the tasks of creating new application instances. Alternately, the system administrator may use an API (Application Program Interface) to access the cloud computing service to perform the tasks of creating new application instances.

In typical situations, the system administrator ("Joe") of an enterprise "ABC", will use an authorized account, such as an account associated with joe@abc.com, to access the cloud computing services. However, in some situations, the system administrator may have created other accounts, such as an account associated with joe@gmail.com, to access the cloud computing services. Although it is possible for the enterprise to simply establish a policy at the cloud computing services to allow only authorized accounts to access the service providers, such a policy is not practical when applied to system administrators or information services officers as these users need access to the cloud computing services to perform management or administrating functions. Therefore, it is often undesirable to strictly deny or block a system administrator's access to a cloud service provider even when they are using an unauthorized account. In the present embodiment, an unauthorized account refers to an account that is not sanctioned by the enterprise. An unauthorized account is therefore also unmanaged.

Accordingly, the enterprise may implement the cloud service account management method of the present invention to detect for unauthorized or unmanaged accounts accessing cloud computing services and to trigger a work flow to bring the unauthorized or unmanaged accounts into management by the enterprise. In embodiments of the present invention, the cloud service account management method is implemented in a cloud service security system 40, which is deployed on the public data network 20 in the present embodiment. The cloud service security system 40 may be deployed on a private data network of an enterprise, or be deployed on a third party private data network, in other embodiments of the present invention.

In operation, the secure web gateway 25 detects for an access to an administration console or an API of a cloud service provider 30 using an unauthorized or unmanaged account and redirects the user device 16 to the cloud service security system 40. The cloud service security system 40 implements the cloud service account management method to bring the unauthorized or unmanaged account into management.

In embodiments of the present invention, the cloud service security system 40 maintains a managed account database 45 containing account identifiers and associated metadata of managed accounts. In this manner, the cloud service security system 40 can determine managed accounts and identify unmanaged accounts efficiently. In some embodiments, the managed account database 45 is a secure database.

Figure 2:
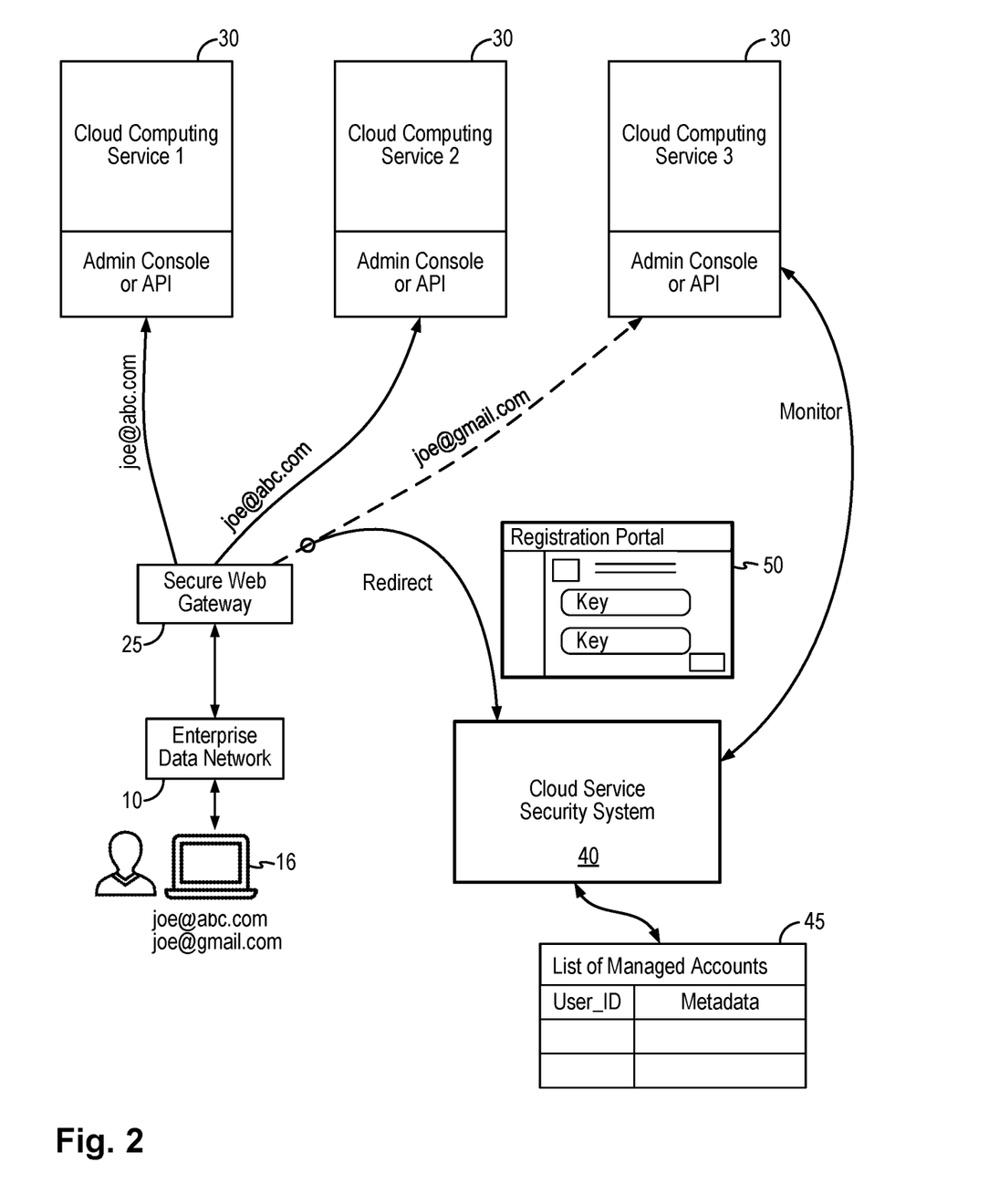
FIG. 2 is a schematic diagram illustrating the operation of the cloud service security system and method in embodiments of the present invention.

FIG. 2 is a schematic diagram illustrating the operation of the cloud service security system and method in embodiments of the present invention. Referring to FIG. 2, a user, such as a system administrator, using a user device 16 on the enterprise data work 10, may attempt to access the administration console of one or more cloud computing services 30 to perform administrative functions, such as to start up an application instance. In other examples, the user may attempt to access the administrative functions of the cloud computing services 30 through an API. In the event that the system administrator 16 uses an authorized account (e.g., joe@abc.com), the secure web gateway 25 confirms the authorized account and allows the network traffic so that the system administrator may access the cloud computing services, such as cloud computing service 1 and cloud computing service 2, to perform administrative functions. In most cases, authorized accounts are under management by the enterprise and are therefore already being managed per the security policy of the enterprise.

However, in some cases, the system administrator may use an unauthorized account (e.g., joe@gmail.com) to access the cloud computing service 3. Alternately, in some cases, the system administrator may use an authorized account (e.g., joe@abc.com) but the account has not yet been registered with the enterprise and therefore the unregistered authorized account is still treated as an unauthorized account. The secure web gateway 25 detects the access to an administration console at cloud computing service 3 using an unauthorized account and redirects the user (system administrator) to the cloud service security system 40. The cloud service security system 40, implementing the cloud service account management method of the present invention, directs the user to a registration portal 50. The registration portal 50 informs the user that he/she should not be using the cloud computing service unmanaged and provides an option for the user to allow the unauthorized account to become managed. Through the registration portal 50, the cloud service account management method requests the user to provide the credentials associated with the unauthorized account. The credentials can be the login credentials of the account, or the security keys or the access token associated with the account. In the present embodiment, the registration portal 50 requests the security keys of the unauthorized account.

The cloud service security system 40, with the security key associated with the unauthorized account, can now bring the unauthorized account into management. More specifically, the cloud service security system 40 can start monitoring the account and applying security policies specified by the enterprise. The cloud service security system 40 further stores the account information, such as the account identifier or user ID and associated metadata into the managed account database 45 to identify the account as being managed. The metadata associated with the managed account may include the credentials (e.g. security key), the date and time the account is put in management and other information.

In embodiments of the present invention, the cloud service security system 40 may perform monitoring of the managed accounts by accessing the accounts at the cloud computing services 30 using the credentials obtained for the managed accounts. The cloud service security system 40 may perform monitoring functions including performing configuration audits to determine whether the application instances created by the account at the cloud computing service are configured correctly. The cloud service security system 40 may apply enterprise specified security policies to the account and may perform periodic audit of user activities at the cloud computing service to determine that the user activities are in compliance with enterprise security policies. In this manner, the accounts are being managed to ensure security for the enterprise.

Figure 3:
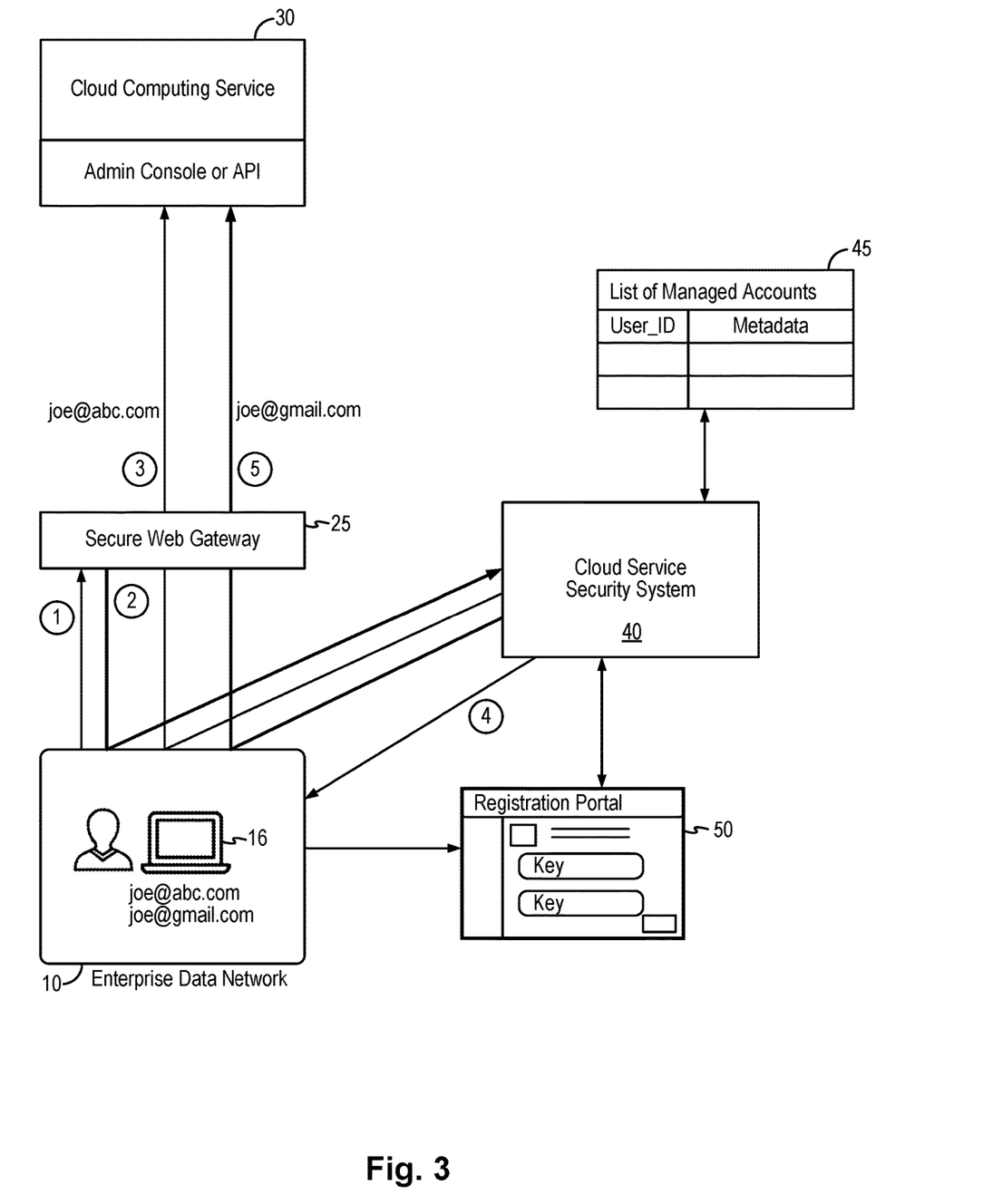
FIG. 3 illustrates the process flow of the cloud service account management method in embodiments of the present invention.

FIG. 3 illustrates the process flow of the cloud service account management method in embodiments of the present invention. Referring to FIG. 3, a system administrator using a user device 16, may attempt to access cloud computing service 1 to perform administrative functions. The user device 16 is operating within the enterprise data network 10 which has all its network traffic passed through the secure web gateway 25. When the user device 16 makes an access to the cloud computing service 30 ("1"), the secure web gateway 25 redirects the user device to the cloud service security system 40 ("2"). Typically, the user device 16 makes an administration console access at the cloud computing service. The user device 16 can also access administrative functions using an API access at the cloud computing service.

The cloud service security system 40 verifies the account being used as an authorized account or an unauthorized account. For example, when the user device 16 uses an authorized account (e.g. joe@abc.com) to make the access, the cloud service security system 40 determines that the account is authorized and returns the user device 16 to the secure web gateway 25 where the secure web gateway 25 allows the network traffic to the cloud computing service 30 ("3").

However, in the event that the user device 16 uses an unauthorized account (e.g. joe@gmail.com) to make the access, the cloud service security system 40 determines that the account is unauthorized and redirects the user device 16 to a registration portal 50 ("4"). At the registration portal 50, the user device may provide credential information for the unauthorized account, such as the security key for the account, to register the account and to render the account managed. Once, the unauthorized account becomes managed, the cloud service security system 40 returns the user device to the secure web gateway 25 where the secure web gateway 25 allows the network traffic to the cloud computing service 30 ("5").

In some embodiments, the cloud service security system 40 uses the managed account database 45 to identify an account as being managed and authorized or as being unmanaged and unauthorized. Furthermore, when an unauthorized account completes the registration, the cloud service security system 40 stores the account information, such as the account identifier or user ID and associated metadata into the managed account database 45 to identify the account as being managed.

Figure 4:
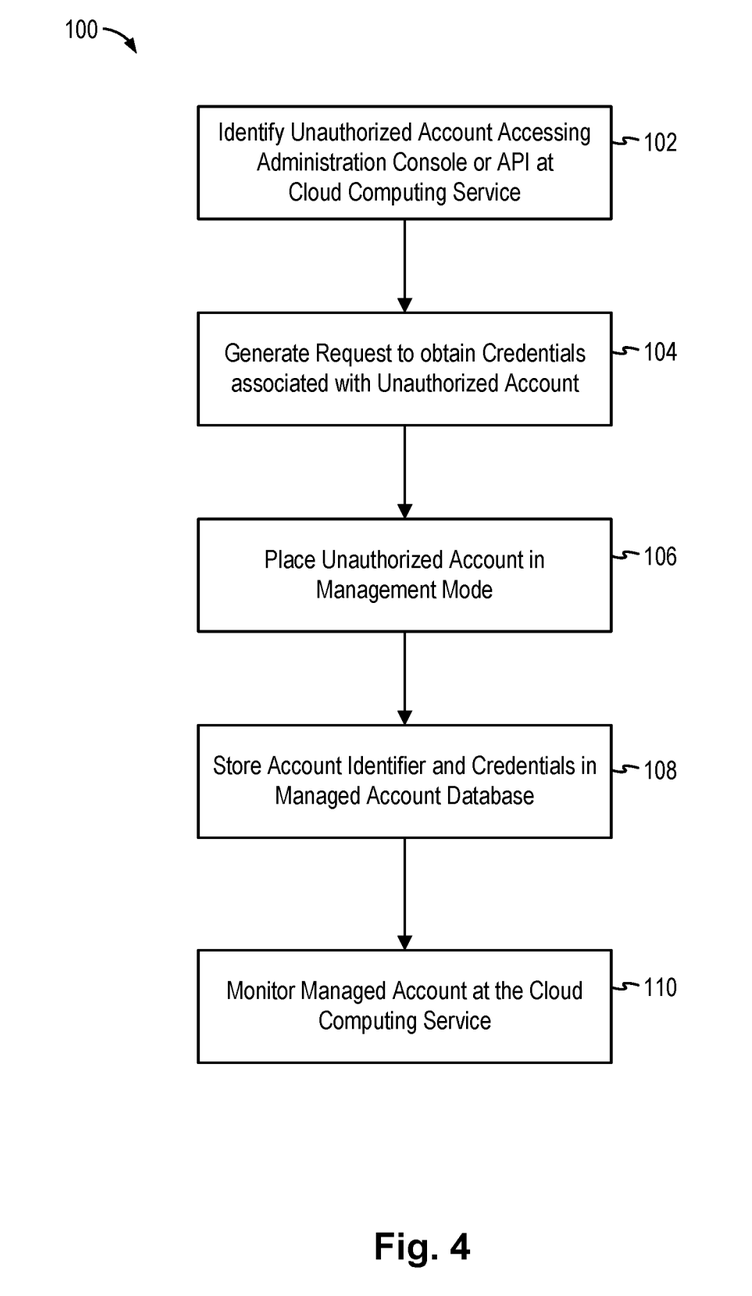
FIG. 4 is a flowchart illustrating a cloud service account management method in embodiments of the present invention.

FIG. 4 is a flowchart illustrating a cloud service account management method in embodiments of the present invention. An enterprise may adopt the cloud computing service account management method of the present invention to ensure security of the enterprise in using cloud computing services. Referring to FIG. 4, a cloud computing service account management method 100 ("method 100") starts by identifying unauthorized accounts attempting to access the administration console or the API of a cloud computing service (102). In some embodiments, the method 100 identifies unauthorized accounts by comparing the account identifier, such as the user ID, to the list of managed accounts stored at the managed account database 45.

The method 100 then initiates a workflow to bring the unauthorized account under management. More specifically, the method 100 generates a request to obtain from the user device credentials associated with the unauthorized account (104). For example, the user may copy the login credential or the security key or an access token from a console of the cloud computing service, such as the administration console, and provide the credential or security key or an access token to the method 100. The method 100 then places the account in a management mode (106). The unauthorized account becomes a managed account. The method 100 further stores the account identifier (such as the user ID) and the credentials and other metadata in a secure managed account database (108). In this manner, the previously unmanaged account has now become managed by method 100. The method 100 may then monitor the managed account at the cloud computing service (110). For example, the method 100 may use the credentials to access the account at the cloud computing service to perform audits and monitoring based on the enterprise's security policy. For example, the method 100 may perform configuration audit of application instances created by the managed account, perform user activity audit and monitor the user activities.

In the event that the credentials for the unauthorized account is not provided to the method 100, the method 100 may implement remedial measures such as generating an alert to the enterprise.

Figure 5:
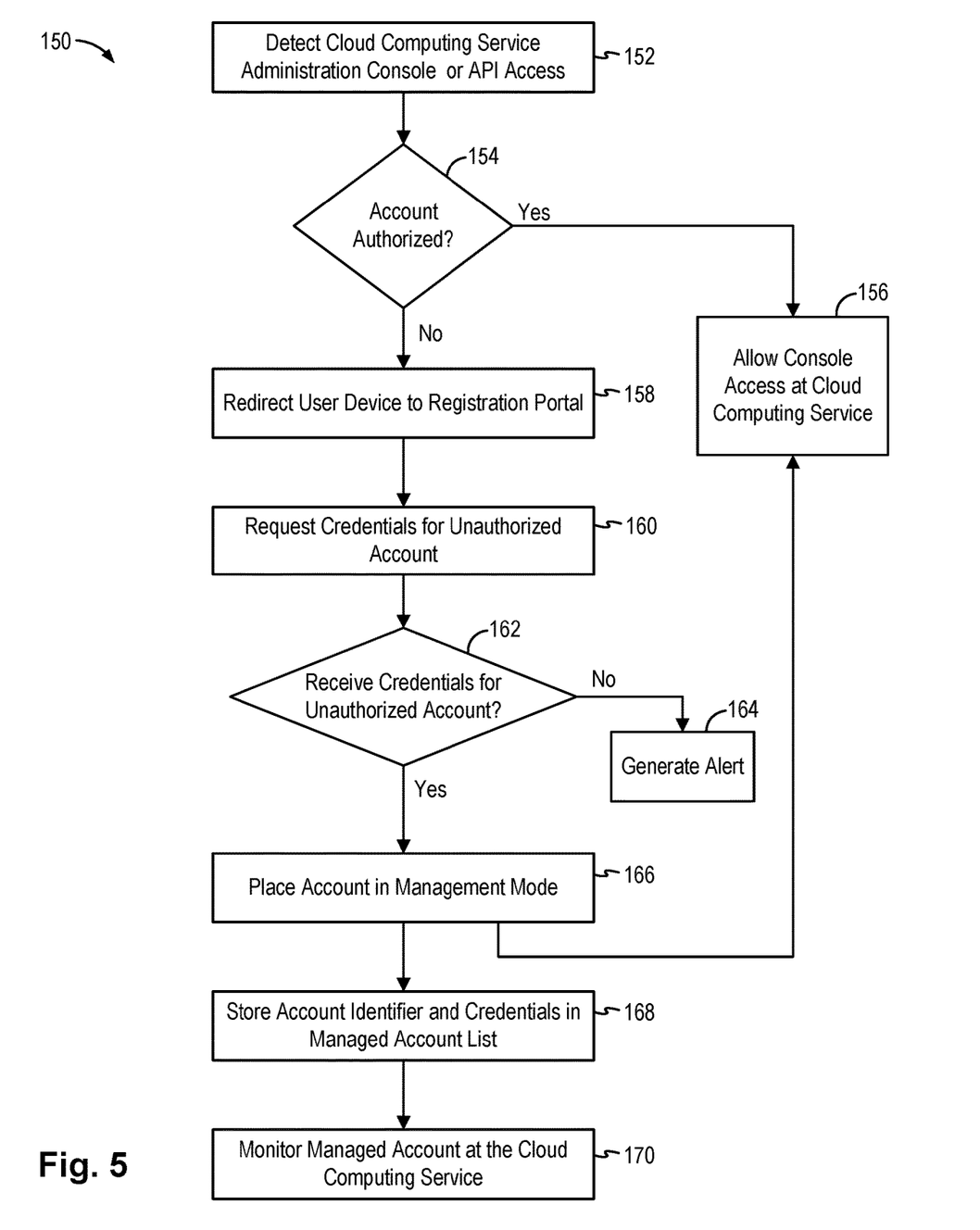
FIG. 5 is a flowchart illustrating a cloud service account management method in an alternate embodiment of the present invention.

FIG. 5 is a flowchart illustrating a cloud computing service account management method in an alternate embodiment of the present invention. An enterprise may adopt the cloud computing service account management method of the present invention to ensure security of the enterprise in using cloud computing services. Referring to FIG. 5, a cloud computing service account management method 150 ("method 150") starts by detecting an administration console access or an API access at a cloud computing service (152). The method 150 then determines if the account used to make the administration console or API access is authorized or not (154). In one embodiment, the method 150 identifies unauthorized accounts by comparing the user ID to the list of managed accounts stored at the managed account database 45.

In the event that the account is determined to be a managed or authorized account, the method 150 allows the managed account to make administration console access at the destination cloud computing service (156). However, in the event that the account is determined to be an unmanaged or unauthorized account, the method 150 initiates a work flow to put the account under management. More specifically, the method 150 redirects the user device to a registration portal (158). In some embodiments, the registration portal is served by the cloud service security system 40. Through the registration portal, the method 150 requests the credentials for the unauthorized/unmanaged account (160). The method 150 then receives the credentials for the unauthorized/unmanaged account (162). For example, the login credentials or the security key or the access token may be copied from a console of the cloud computing service, such as the administration console, and provided to the method 150 by pasting the credentials/security keys/access token onto the registration portal.

In the event that the credentials are not
provided, the method 150 may generate an alert to the enterprise of the access by the unauthorized account (164). In the event that the credentials for the unauthorized/unmanaged account is provided, the method 150 enables monitoring of the account at the cloud computing service (166). The account then becomes a managed account. The method 150 then allows the managed account to make administration console access at the destination cloud computing service (156). The method 150 further stores the account identifier (such as the user ID) and the credentials and other metadata in the managed account database (168). The method 150 can then monitor the account at the cloud computing service based on the security policy of the enterprise (170). For example, the method 150 may use the credentials to access the account at the cloud computing service to perform configuration audit, to perform user activity audit and to monitor the user activities. In this manner, an unmanaged account becomes managed. In one example, the configuration audit may detect that an instance of an application on the cloud computing service has not been configured correctly and the method 150 may alert the user or system administrator to take corrective action.

Cloud service providers, such as Amazon Web Services or "AWS", provide various cloud computing services to enterprises. For example, cloud service provides may provide servers, storage, sales management, and database services for enterprises. As described above, a cloud service provider typically provide an administration console, also referred to as a "management console," to enable a system administrator or an account owner to administer or manage the cloud services provided by the cloud service provider. Typically, a user of an enterprise, using the administration console, creates an account, also referred to as a "cloud service account," at the cloud service provider. The user may be a system administrator of the enterprise or any users acting on behalf of the enterprise. The user who creates the cloud service account becomes the account owner of the cloud service account. The account owner may manage various aspect of the account using the administration console. For example, the account owner may use the administration console to start and stop service instances, such as starting a database instance or a server instance at the cloud service provider. The account owner can perform other management functions, such as billing and user management. More specifically, the system administrator may designate account users who can have access to the cloud service account and what resources the users can use and what operations the users can perform using the account.

Figure 6:
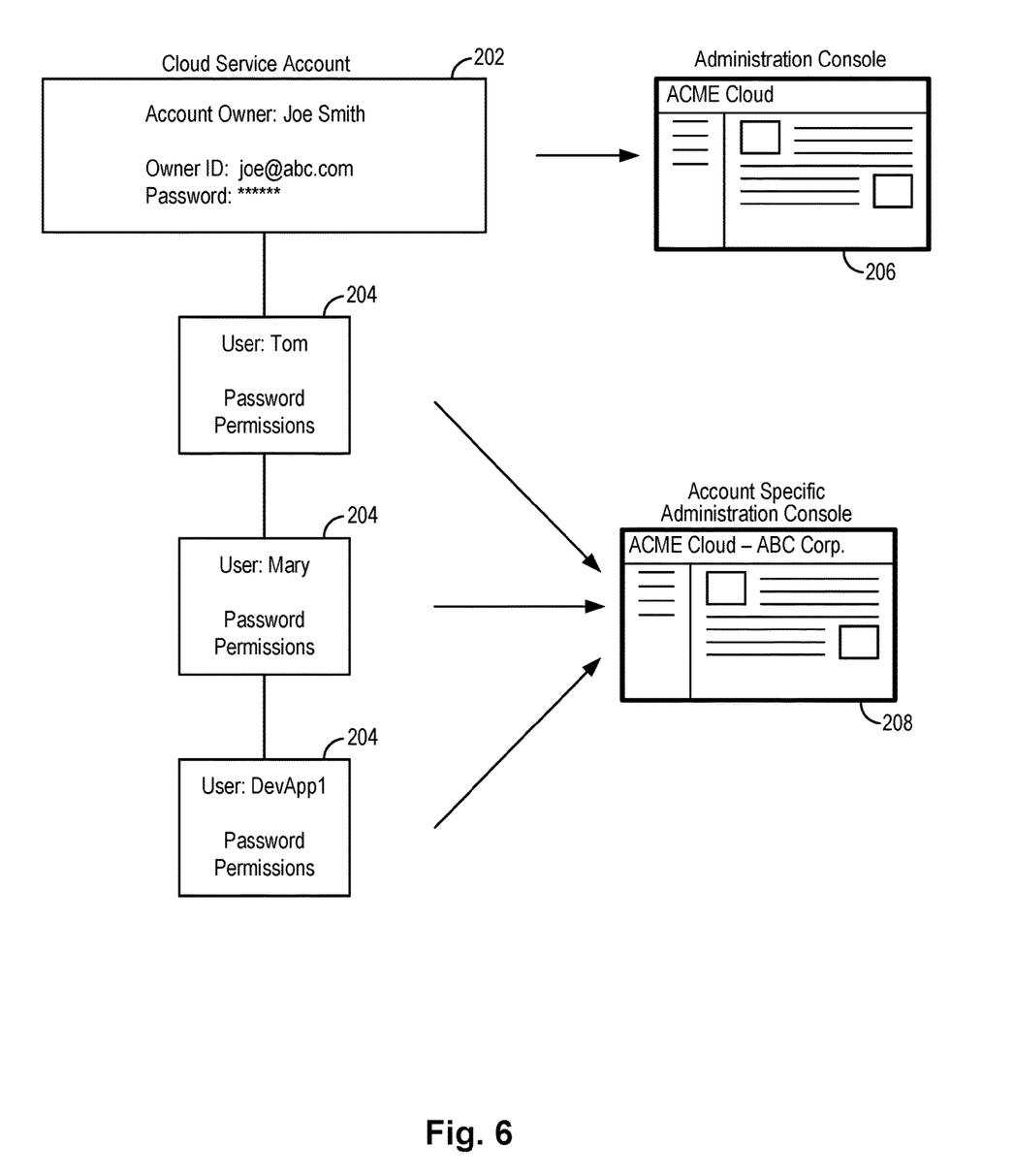
FIG. 6 illustrates a configuration of a cloud service account in some examples.

FIG. 6 illustrates a configuration of a cloud service account in some examples. Referring to FIG. 6, a system administrator or a user of an enterprise may create a cloud service account 202 at a cloud service provider. The system administrator or the user access an administration console 206 of the cloud service provider to create the cloud service account and perform other management functions. The system administrator or the user, for example, "Joe Smith," becomes the account owner of the cloud service account. The cloud service account 202 is associated with an owner identifier (owner ID) which is typically the email address of the account owner. In the present example, the account owner uses his enterprise email address joe@abc.com as the owner ID. The account owner also sets a password for the account. The owner ID and the password form the root account credentials for the cloud service account 202.

In some examples, the account owner may want to grant access to the cloud service account 202 to one or more other users. For example, the cloud service account may be established for a business group within the enterprise and the account owner may want to grant access to the cloud service account 202 to all members of the business group. Accordingly, the account owner ("Joe Smith") may use the administration console 206 to create authorized account users 204 to the cloud service account. The account owner may use the administration console 206 to create users, set user passwords and user permission levels. In this manner, the account owner can control access to cloud service resources for the users, can control who can sign in to the account 202 and what cloud service resources they can use.

In the present example, the account owner has created users using the user names: Tom, Mary and DevApp1. In some cases, the account owner may obtain a URL (universal resource locator) that is specific to cloud service account 202 to allow users to sign in to an account specific administration console 208 to access the cloud services. In one example, the account-specific URL directs the user to an account sign-in page where the user can sign in using his/her user name and his/her password. In this manner, the user does not need to know the root account credential to the cloud service account in order to access the account.

As discussed above, in some cases, users of an enterprise may set up shadow accounts at the cloud service providers.

For example, an account owner generally uses her enterprise email address (e.g. jane@abc.com) to set up cloud service accounts at the cloud service providers on behalf of the enterprise. When a cloud service account is created using an enterprise email address or an enterprise-sanctioned email address, the cloud service account will be put under management as a managed account of the enterprise and be monitored by the enterprise for security risk. However, in some cases, the account owner may use an email address that is not authorized by the enterprise. For example, the account owner may create a cloud service account using her personal email address, such as an account using jane@gmail.com. A cloud service account created using an unauthorized or unsanctioned email address of an enterprise is called a shadow account and the shadow account is an unauthorized cloud service account because it is not managed or monitored by the enterprise.

In embodiments of the present invention, a cloud service account management method identifies unauthorized or unmanaged cloud service accounts making administration console or API access at a cloud computing service and triggers a work flow to place the unauthorized/unmanaged accounts under management. In particular, the cloud service account management method enables an account owner of an authorized cloud service account to provide the access credential for the account and the method then retrieves the user list under the account using the access credential. In this manner, the cloud service account is placed under management for the account owner and also for all the account users. In particular, the cloud service account management method only requires the account owner to provide the access credential for the cloud service account and the account users are automatically managed without requiring each account user to provide the access credential separately. In some embodiments, the cloud service account management method, after obtaining the access credential and putting the cloud service account under management, will periodically access the cloud service account to update the user list. Therefore, new account users added to the cloud service account will be automatically brought under management and account users removed from the cloud service account will also be noted for continuing security monitoring purpose.

Figure 7:
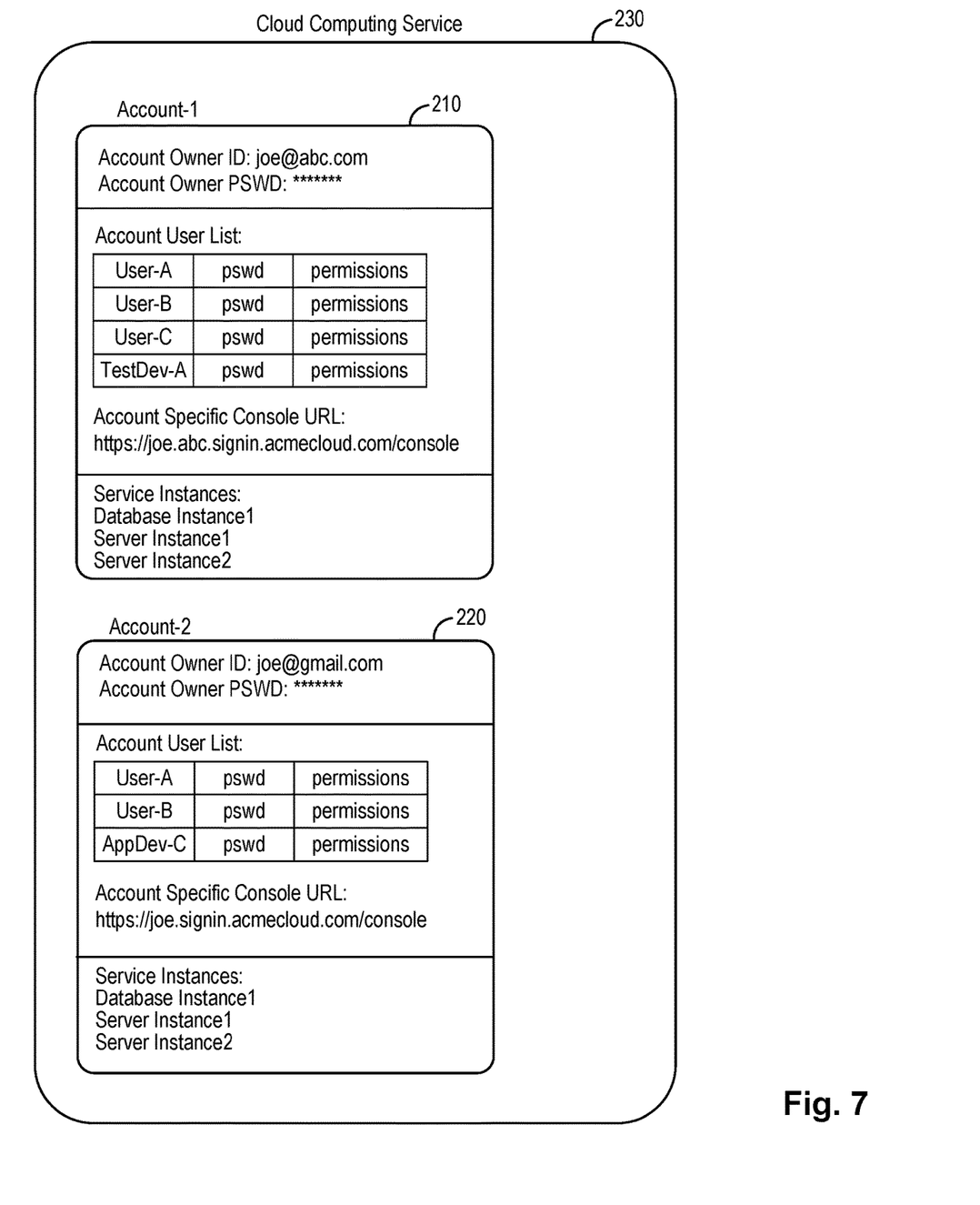
FIG. 7 illustrates configurations of cloud service accounts in a cloud service provider in some examples.

FIG. 7 illustrates configurations of cloud service accounts in a cloud service provider in some examples. Referring to FIG. 7, a cloud service provider 230 provides cloud computing services to various enterprises or users. In the present example, a user of the enterprise may have created an account 210, denoted "Account-1", using email address joe@abc.com associated with the enterprise. This account includes an account user list where users are identified by user names, such as User-A, User-B and TestDev-A. The account owner may access the administration console at the cloud computing service (e.g. Acme Cloud) using a general URL, such as https://console.acmecloud.com/console/. Meanwhile, the users may access an account specific console to access the cloud computing services using an account specific console URL (e.g. https://joe.abc.signin.acmecloud.com/console). The account owner, or the account users with appropriate permissions, may configure the account to use one or more of the cloud computing services provided by the cloud service provider 230. In the present example, service instances have been created for a database instance, a server instance 1 and a server instance 2. Because the account owner used an authorized or sanctioned email address to set up the service account Account-1, the enterprise is able to identify the account and bring the account under management per the security policy of the enterprise.

Furthermore, in the present example, a user of the enterprise may have created an account 220, denoted "Account-2", using an email address joe@gmail.com that is not authorized or sanctioned by the enterprise. The account Account-2 includes an account user list where users are identified by user names, such as User-A, User-B and AppDev-C. The users may access an account specific console to access the cloud computing services using an account specific console URL (e.g. https://joe.signin.acmecloud.com/console). The account owner, or the account users with appropriate permissions, may configure the account to use one or more of the cloud computing services provided by the cloud service provider 230. In the present example, service instances have been created for a database instance, a server instance 1 and a server instance 2. Because the account owner used an unauthorized email address to set up the service account Account-2, the enterprise may not readily detect the existence of the account. The service account Account-2 becomes a shadow account of the enterprise as the account is not managed or monitored by the enterprise. The service account Account-2, created using an unauthorized email address, is thus an unauthorized account and is unmanaged by the enterprise.

Figure 8:
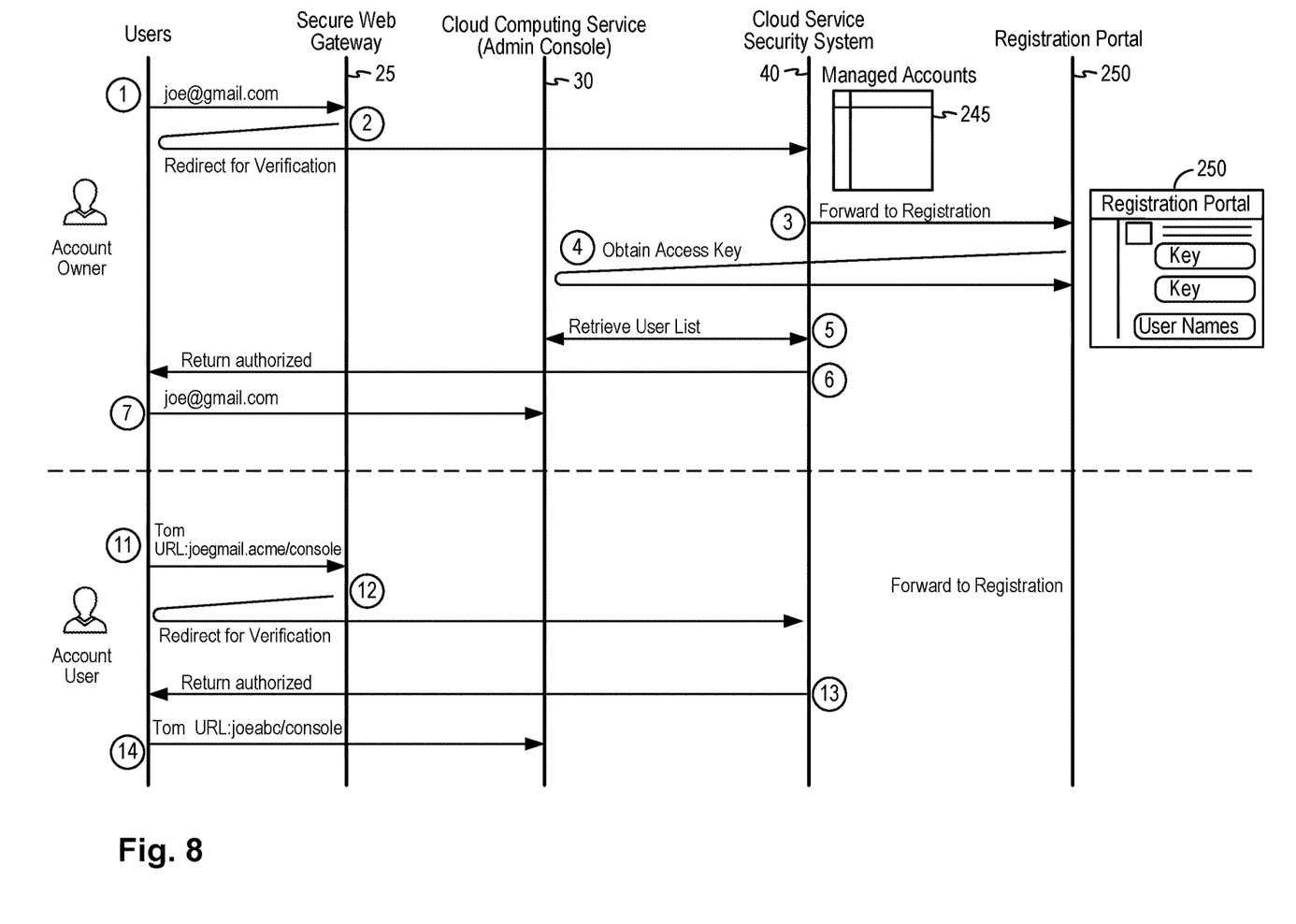
FIG. 8 illustrates the operation of the cloud service account management method in bringing an unauthorized account into management in embodiments of the present invention.

FIG. 8 illustrates the operation of the cloud service account management method in bringing an unauthorized account into management in embodiments of the present invention. In embodiments of the present invention, the cloud service account management method can be implemented in the cloud service security system of FIG. 2. Like elements in FIGS. 2 and 8 are given like reference numerals and will not be further described. Referring to FIG. 8, an account owner has created a cloud service account at a cloud computing service 30 using an unauthorized email address joe@gmail.com. The account user, using a user device on the enterprise data network, may attempt to access the administration console of the cloud computing service 30 to perform administrative functions, such as to start up an application instance. In other examples, the user may attempt to access the administration console of the cloud computing service 30 through an API. At "1", the account owner attempts to access the administration console of the cloud computing service 30 using the unauthorized email address joe@gmail.com at a user device on the enterprise data network.

The secure web gateway 25 detects a login request for the cloud computing service 30 from the user and redirects the login request to the cloud service security system 40 ("2"). The cloud service security system 40, implementing the cloud service account management method of the present invention, detects that the access to the administration console at the cloud computing service 30 is being made using an unauthorized email address ("3"). The cloud service security system 40 then directs the user to a registration portal 250. The registration portal 250 informs the account owner that he/she should not be using the cloud computing service unmanaged and provides an option for the user to allow the unauthorized or unmanaged account to become managed by the enterprise. In the present description, an unauthorized account is also an unmanaged account. Through the registration portal 250, the cloud service account management method requests the account owner to provide the access credentials associated with the unauthorized account ("4"). The access credentials are obtained from the cloud computing service 30. The credentials can be the login credentials or the root account credentials of the account, or the security keys or the access token associated with the account. In the present embodiment, after the registration portal 250 obtains the security keys of the unauthorized account, the cloud service security system 40 initiates a request, using the access credentials, to retrieve the list of account users for the account ("5"). The retrieval of the user list can take place anytime after obtaining the access credentials and does not have to take place right after obtaining the access credentials.

The cloud service security system 40, with the security key associated with the unauthorized account, can now bring the unauthorized account into management. More specifically, the cloud service security system 40 can start monitoring the account and applying security policies specified by the enterprise. The cloud service security system 40 further stores the account information, such as the account identifier or user ID (i.e., account owner email address) and associated metadata into a managed account database 245 to identify the account as being managed. The metadata associated with the managed account may include the credentials (e.g. security key), the date and time the account is put in management and the list of account users for the account.

With the access credential and user list thus obtained, the cloud service security system 40 returns to the account owner ("6") where the account owner can now access the administration console of the cloud computing service 30 using the account identifier joe@gmail.com. The secure web gate 25 recognizes the access as being authorized and allows the access to pass through ("7"). In operation, the security web gateway redirects all login requests to the cloud service security system 40 to verify the account being accessed is being managed. After verification, the security web gateway allows the network traffic to pass from the user to the cloud computing service 30.

In embodiments of the present invention, the cloud service security system 40 may perform monitoring of the managed accounts by accessing the accounts at the cloud computing services 30 using the credentials obtained for the managed accounts. The cloud service security system 40 may perform monitoring functions including performing configuration audits to determine whether the application instances created by the account at the cloud computing service are configured correctly. The cloud service security system 40 may apply enterprise specified security policies to the account and may perform periodic audit of user activities at the cloud computing service to determine that the user activities are in compliance with enterprise security policies. Furthermore, the cloud service security system 40 may perform audit of user activates for all the account users of the managed account to ensure security policies are complied with for all the account users. In this manner, the unauthorized account is being managed to ensure security for the enterprise.

Once the cloud service account created by account owner joe@gmail.com has been registered and brought under management by enterprise, subsequent access by account users of the cloud service account can be made without requiring further registration. For example, at "11", a user Tom attempts to access the administration console of the cloud computing service using the account specific URL (e.g. joe.gmail.com/console). The secure web gateway 25 redirect the access request to the cloud security system 40 for verification ("12"). The cloud security system 40 determines that the account is in the managed account database 245 and further determines that the user Tom is an identified account user. The cloud service security system 40 returns the access request to the user ("13") as authorized and the user Tom can now access the administration console of the cloud computing service 30. The secure web gate 25 recognizes the access as being authorized and allows the access to pass through ("14"). In this manner, the account user Tom does not need to provide the access credential for the cloud service account in order to use the account. Instead, the access credential and the user list have been previously provided by the account owner. The cloud service security system may update the user list periodically to monitor changes to the user list.

Figure 9:
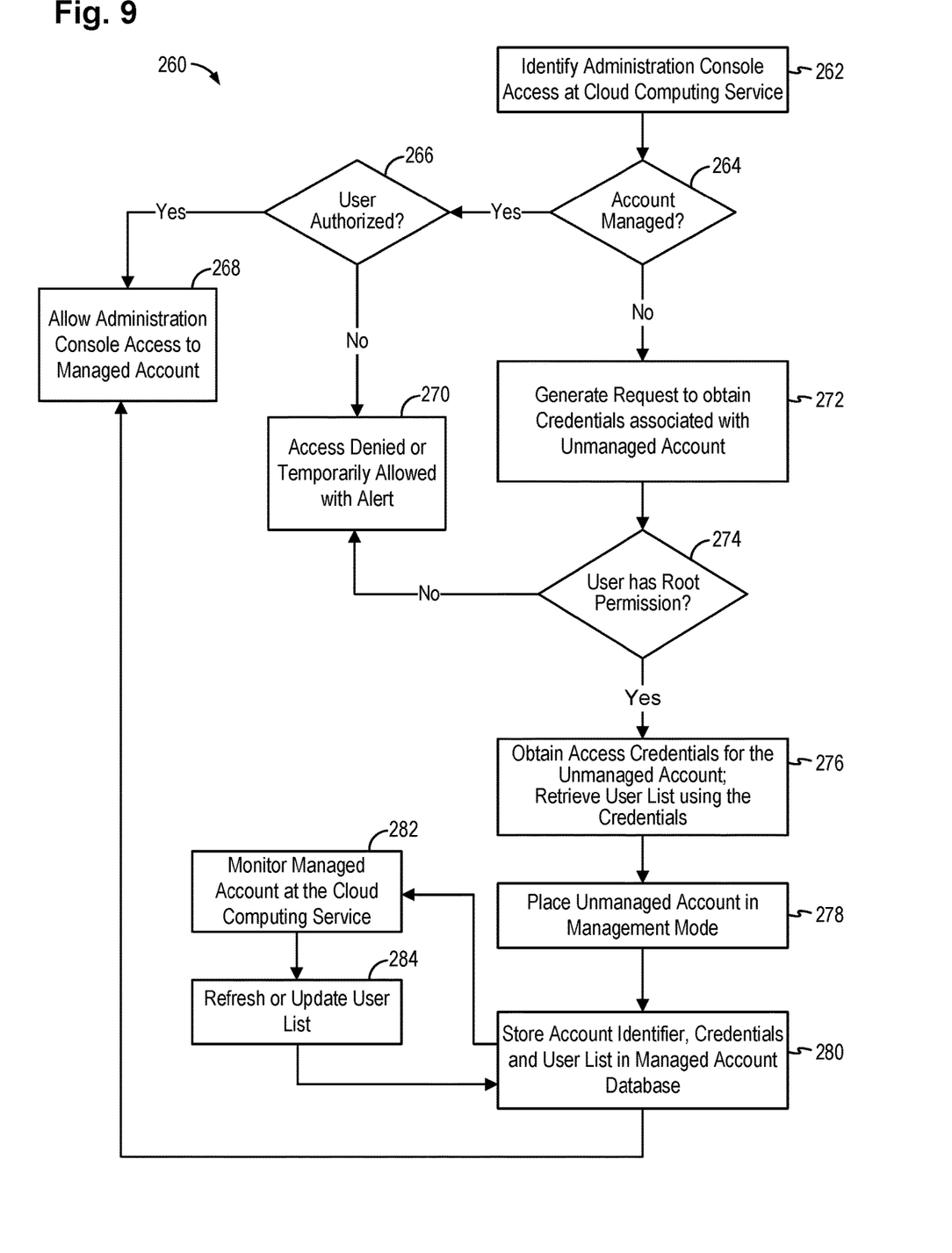
FIG. 9 is a flowchart illustrating a cloud service account management method in embodiments of the present invention.

FIG. 9 is a flowchart illustrating a cloud service account management method in embodiments of the present invention. An enterprise may adopt the cloud computing service account management method of the present invention to ensure security of the enterprise in using cloud computing services. In some embodiments, the cloud service account management method is implemented in a cloud service security system, such as the cloud service security system 40, of FIGS. 1 and 2. Referring to FIG. 9, a cloud computing service account management method 260 ("method 260") starts by identifying an administration console access to a cloud service account at a cloud computing service by a user device (262). The method 260 then determines if the account being accessed is a managed account (264). In one embodiment, the method 260 identifies managed vs. unmanaged accounts by comparing the user ID associated with the access request to the list of managed accounts stored at a managed account database. A cloud service account created using an unauthorized or unsanctioned email address of the enterprise is generally an unauthorized account which is also unmanaged by the enterprise. An unauthorized account is thus also an unmanaged account.

After determining that the account is a managed account, the method 260 determines if the user making the access request is an authorized user (266). An authorized user may be the account owner of a managed account or one of the account users listed in the managed account. If the user is an authorized user, the method 260 allows the administration console access to the account (268).

In the event that the method 260 determines that the user is not an authorized user (266), the method 260 may deny the access request or the method 260 may temporarily allow the access request with an alert to the user that the user is not authorized for the cloud service account (270). The method 260 may implement other remedial measures such as generating an alert to the enterprise. The user may have to request the account owner to update or refresh the user list. In some cases, the account owner may initiate a refresh of the user list at the cloud service security system so that the user becomes an authorized user.

In the event that the method 260 determines that the account is not a managed account (264), the method 260 redirects the user device to a registration portal and generates a request to obtain the access credentials associated with the unmanaged account (272). The method 260 determines if the user has the root permission to obtain the access credentials (274). In the event that the user is not the account owner and thus does not have the root permission to obtain the access credentials, the method 260 may deny the access request or the method 260 may temporarily allow the access request with an alert to the user that the user is not authorized for the account (270). The method 260 may implement other remedial measures such as generating an alert to the enterprise.

In the event that the user is the account owner and has the root permission to obtain the access credentials, the method 260 proceeds to obtain the access credentials for the account (276). Furthermore, after obtaining the access credentials, the method 260 accesses the account at cloud computing service to retrieve the list of account users associated with the account. Note that in the present embodiment, the user list is retrieved right after obtaining the access credentials. In other embodiments, the user list can be retrieved at a later time and does not have to be retrieved contemporaneously with obtaining the access credential.

The method 260 then place the unmanaged account in management mode and the account becomes a managed account (278). The method 260 then enables monitoring of the account at the cloud computing service.

The method 260 further stores the account identifier (such as the email address of the account owner) and the access credentials and other metadata in the managed account database (280). The method 260 further stores the user list of the account in the managed account database. The method 260 then allows the administration console access to the account (268). The managed account database can be used to determine if an account is managed or not and if a user is an authorized user under the account or not.

With the access credential thus provided, the method 260 can monitor the account at the cloud computing service based on the security policy of the enterprise (282). For example, the method 260 may use the access credentials to access the account at the cloud computing service to perform configuration audit, to perform user activity audit and to monitor the user activities. In this manner, an unmanaged account becomes managed. In one example, the configuration audit may detect that an instance of an application on the cloud computing service has not been configured correctly and the method 260 may alert the user or system administrator to take corrective action.

The method 260 further refreshes or updates the user list for the managed account periodically (284). For example, the method 260 may update the user list on a daily basis. In this manner, any user added to the cloud service account will be automatically added to the managed account database so that access requests by new account users will be allowed without delays. Alternately, any user removed from the cloud service account will be removed from the managed account database so that future access can be properly monitored.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of implementing cloud service account management by an enterprise, the method comprising:
   receiving, using a hardware processor of a gateway, traffic associated with an access request to an administration console of a cloud service account at a cloud computing service;
   generating, using the hardware processor, a request to obtain access credentials associated with an existing unmanaged account associated with the access request;
   placing, using the hardware processor, the existing unmanaged account in a management mode so that the existing unmanaged account becomes a managed account;
   retrieving, using the access credentials, a list of account users associated with the cloud service account; and
   allowing an access request to the administration console of the cloud service account by a user in the list of account users.

2. The method of claim 1, further comprising:
   storing, using the hardware processor, an account identifier associated with the managed account, the access credentials, and the list of account users in a managed account database; and
   periodically accessing, using the access credentials, the managed account to update the list of account users.

3. The method of claim 2, further comprising determining whether the access request is made using the existing unmanaged account, wherein determining whether the access request is made using the existing unmanaged account comprises:
   identifying the existing unmanaged account as being unmanaged by comparing the account identifier to a list of managed accounts in the managed account database, the existing unmanaged account being unmanaged when the account identifier is not present in the list of managed accounts.

4. The method of claim 1, further comprising:
   in response to the determining that an access request is made to an account-specific administration console of the managed account, determining whether the access request is made by an authorized user under the managed account, the authorized user being identified in the list of account users;
   in response to the determining that the access request is made by an authorized user to the managed account, allowing the access request to the account-specific administration console at the cloud computing service; and
   in response to the determining that the access request is made by an unauthorized user to the managed account, denying the access request to the account-specific administration console administration console at the cloud computing service and generating an alert.

5. The method of claim 1, further comprising:
   in response to the determining that an access request is made to an account-specific administration console of the managed account, determining whether the access request is made by an authorized user under the managed account, the authorized user being identified in the list of account users;
   in response to the determining that the access request is made by an authorized user to the managed account, allowing the access request to the account-specific administration console at the cloud computing service; and
   in response to the determining that the access request is made by an unauthorized user to the managed account, allowing the access request to the account-specific administration console administration console at the cloud computing service with an alert to the unauthorized user.

6. The method of claim 1, wherein receiving, using the hardware processor, the traffic associated with the access request to the administration console of the cloud service account at the cloud computing service comprises:
   receiving, using the hardware processor, the traffic associated with the access request using an application program interface (API) access to the administration console of the cloud service account at the cloud computing service.

7. The method of claim 1, wherein generating, using the hardware processor, the request to obtain access credentials associated with the existing unmanaged account comprises:

generating, using the hardware processor, a request to obtain a security key associated with the existing unmanaged account.

8. The method of claim 1, wherein generating, using the hardware processor, the request to obtain access credential associated with the existing unmanaged account comprises:
generating, using the hardware processor, a request to obtain an access token associated with the existing unmanaged account.

9. The method of claim 1, wherein generating, using the hardware processor, the request to obtain access credentials associated with the existing unmanaged account comprises:
providing, using the hardware processor, a registration portal requesting the access credentials associated with the existing unmanaged account; and
receiving the access credentials entered onto the registration portal.

10. The method of claim 1, further comprising monitoring, using the hardware processor, the managed account at the cloud computing service, monitoring, using the hardware processor, the managed account at the cloud computing service comprises:
using the access credentials to access the managed account at the cloud computing service; and
performing an audit of the managed account at the cloud computing service.

11. A system for implementing cloud service account management by an enterprise, the system comprising:
a hardware processor of a gateway; and
a memory coupled with the hardware processor, wherein the memory is configured to provide the processor with instructions which when executed cause the processor to:
receive traffic associated with an access request to an administration console of a cloud service account at a cloud computing service;
generate a request to obtain access credentials associated with an existing unmanaged account associated with the access request;
place the existing unmanaged account in a management mode so that the existing unmanaged account becomes a managed account;
retrieve, using the access credentials, a list of account users associated with the cloud service account; and
allow an access request to the administration console of the cloud service account by a user in the list of account users.

12. The system of claim 11, wherein the memory is further configured to provide the processor with instructions which when executed cause the processor to:
store an account identifier associated with the managed account, the access credentials, and the list of account users in a managed account database; and
periodically access, using the access credentials, the managed account to update the list of account users.

13. The system of claim 12, wherein the memory is further configured to provide the processor with instructions which when executed cause the processor to:
identify the existing unmanaged account as being unmanaged by comparing the account identifier to a list of managed accounts in the managed account database, the existing unmanaged account being unmanaged when the account identifier is not present in the list of managed accounts.

14. The system of claim 11, wherein the memory is further configured to provide the processor with instructions which when executed cause the processor to:
in response to the determining that an access request is made to an account-specific administration console of the managed account, determine whether the access request is made by an authorized user under the managed account, the authorized user being identified in the list of account users;
in response to the determining that the access request is made by an authorized user to the managed account, allow the access request to the account-specific administration console at the cloud computing service; and
in response to the determining that the access request is made by an unauthorized user to the managed account, deny the access request to the account-specific administration console administration console at the cloud computing service and generate an alert.

15. The system of claim 11, wherein the memory is further configured to provide the processor with instructions which when executed cause the processor to:
in response to the determining that an access request is made to an account-specific administration console of the managed account, determine whether the access request is made by an authorized user under the managed account, the authorized user being identified in the list of account users;
in response to the determining that the access request is made by an authorized user to the managed account, allow the access request to the account-specific administration console at the cloud computing service; and
in response to the determining that the access request is made by an unauthorized user to the managed account, allow the access request to the account-specific administration console administration console at the cloud computing service with an alert to the unauthorized user.

16. The system of claim 11, wherein the memory is further configured to provide the processor with instructions which when executed cause the processor to:
receive the traffic associated with the access request using an application program interface (API) access to the administration console of the cloud service account at the cloud computing service.

17. The system of claim 11, wherein the memory is further configured to provide the processor with instructions which when executed cause the processor to:
generate a request to obtain a security key associated with the existing unmanaged account.

18. The system of claim 11, wherein the memory is further configured to provide the processor with instructions which when executed cause the processor to:
generate a request to obtain an access token associated with the existing unmanaged account.

19. The system of claim 11, wherein the memory is further configured to provide the processor with instructions which when executed cause the processor to:
provide a registration portal requesting the access credentials associated with the existing unmanaged account; and
receive the access credentials entered onto the registration portal.

20. The system of claim 11, wherein the memory is further configured to provide the processor with instructions which when executed cause the processor to:
use the access credentials to access the managed account at the cloud computing service; and perform an audit of the managed account at the cloud computing service.

\* \* \* \* \*